Nov. 29, 1955     F. E. REULAND     2,725,123
MAGNETIC BRAKE

Filed May 19, 1952     3 Sheets-Sheet 1

INVENTOR.
FRANK E. REULAND,
BY
Paul A. Weilein
ATTORNEY.

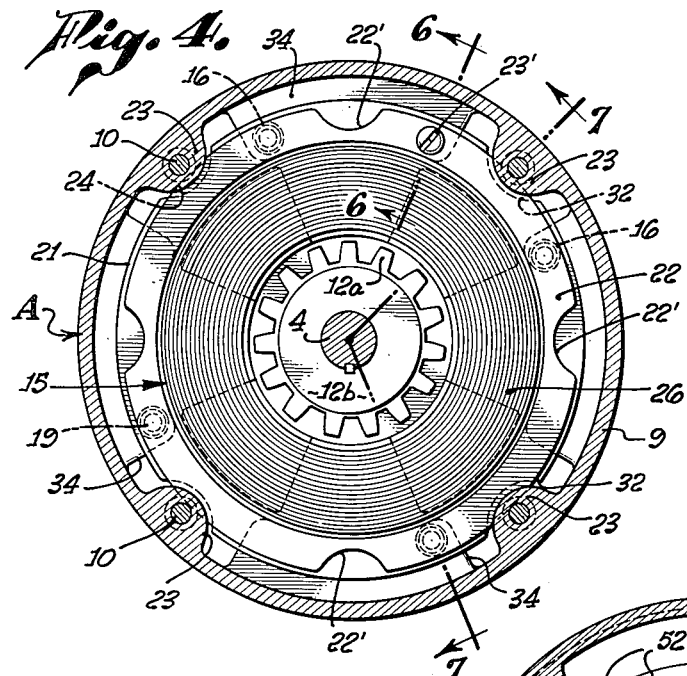
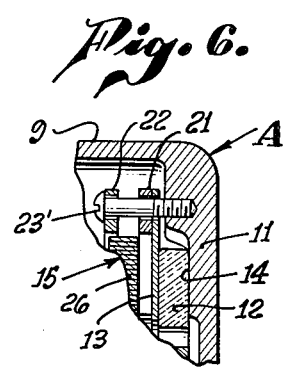
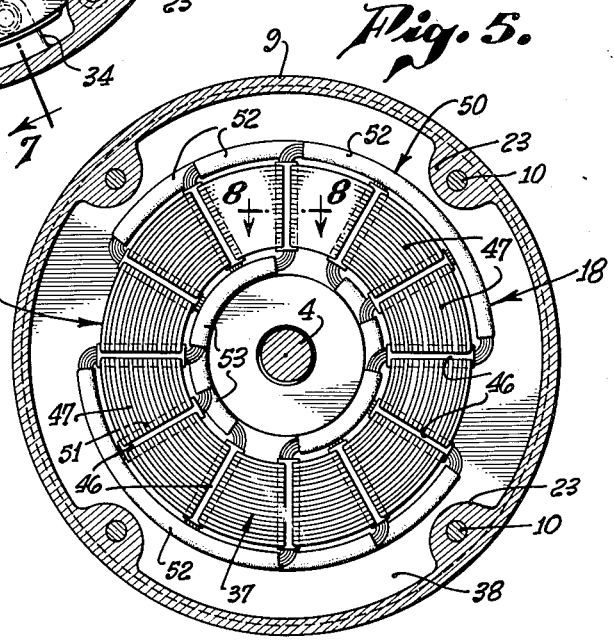
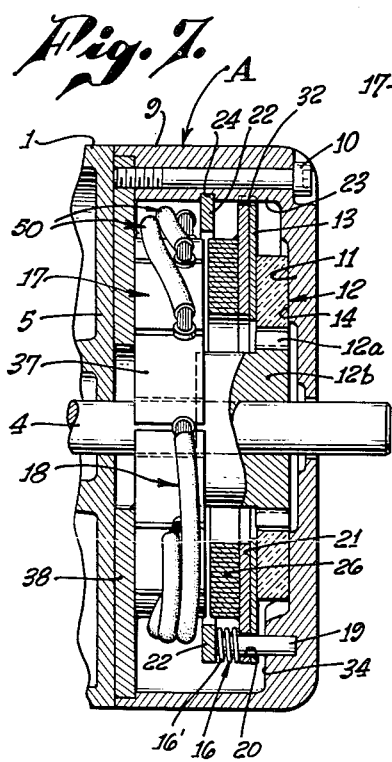
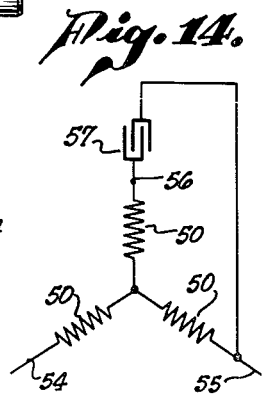
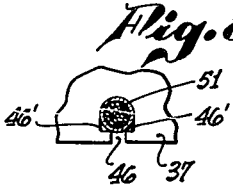

Nov. 29, 1955   F. E. REULAND   2,725,123
MAGNETIC BRAKE
Filed May 19, 1952   3 Sheets-Sheet 3
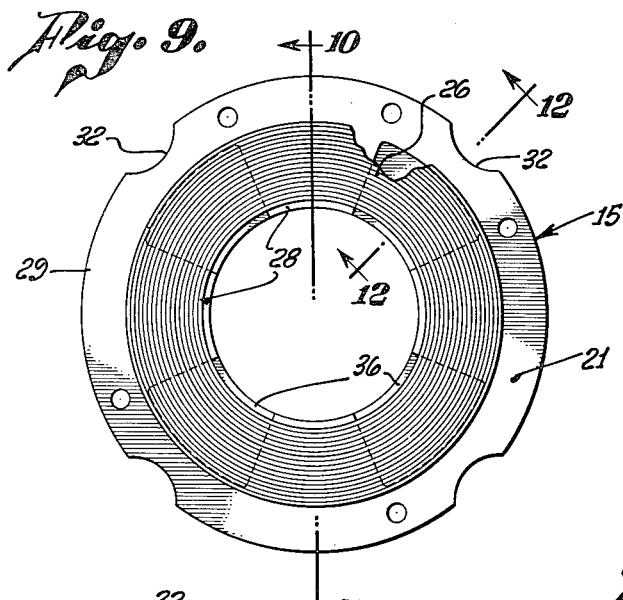
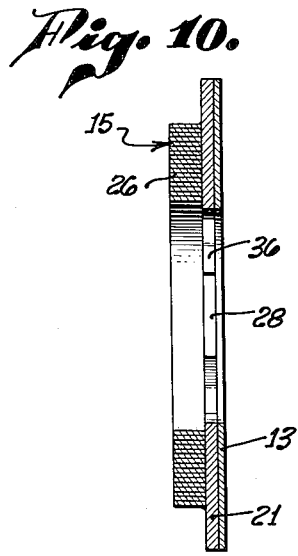
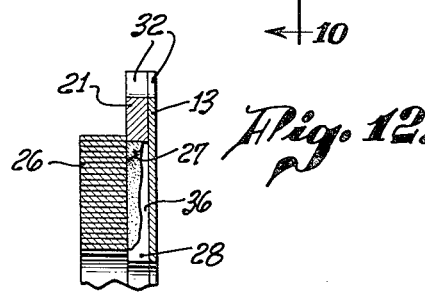
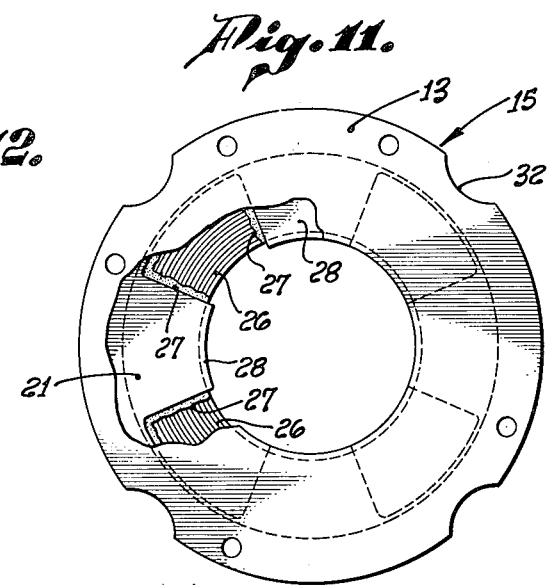
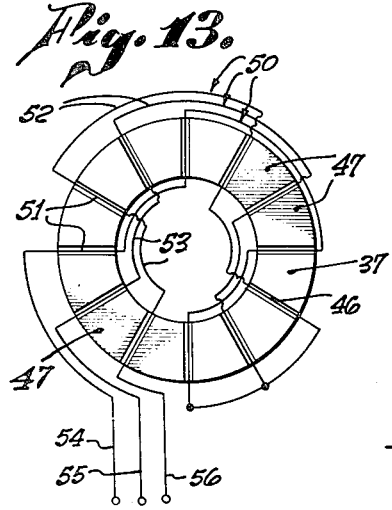
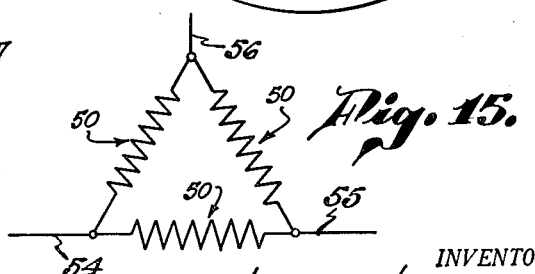
INVENTOR.
FRANK E. REULAND,
BY
Paul A. Weilein
ATTORNEY.

United States Patent Office 2,725,123
Patented Nov. 29, 1955

2,725,123

MAGNETIC BRAKE

Frank E. Reuland, Alhambra, Calif.

Application May 19, 1952, Serial No. 288,699

11 Claims. (Cl. 188—171)

This invention relates to electro-magnetically controlled brakes of the type in which the braking means is set by spring means and released by electromagnetic means, for controlling a rotary shaft, for example the shaft of an electric motor or a shaft driven by the motor. In these brakes the electromagnetic means operates to release the brake upon operation of the electric motor, and permits the spring means to set the brake incident to deenergizing the motor.

It is an object of this invention to provide an improved brake of this character which consists of a lesser number of parts, and is of less length and weight and more compact and reliable in operation than brakes of this type heretofore provided.

It is another object of this invention to provide a magnetic brake such as described which is self adjusting to compensate for wear.

It is a further object hereof to provide an improved electromagnet means which makes it possible to use a strong spring means for a quick setting of the brake.

It is another object hereof to provide an electromagnetic brake adapted for operation by single phase, polyphase, or direct current.

It is another object of this invention to provide in a brake such as described, a novel electromagnet structure of simple and compact construction, which prevents hum and chatter, as well as makes possible the use of a strong spring means for quickly and positively setting the brake.

It is another object of this invention to provide an improved electromagnet structure in which a single laminated core formed to surround the shaft to be controlled, and having simple form of winding mounted thereon, is cooperable with a single armature also formed to surround the shaft, to develop a flux and an efficiency exceeding that of a plurality of separate magnets having separate cores, such as heretofore employed in magnetic brakes of the type to which this invention relates. As a result of this construction and arrangement, an efficient brake is provided with comparatively few parts, in a more compact, lighter, and shorter unit than heretofore, with the additional advantages of permitting the use of a strong spring means, causing a quick setting of the brake, and eliminating wear-compensating adjustments, as well as reducing hum and chatter without shading means and providing for operation of the unit with single, polyphase, or direct current.

It is an additional object to provide in a brake such as described a novel electromagnet structure in which a single annular, laminated core having grooves circumferentially spaced in the surface of the core opposed to the armature, make it possible to employ a novel winding or coil taking up but little space beyond that occupied by the core and which causes a strong magnetic flux to be developed.

It is another object to provide a novel armature structure wherein an annular, laminated core surrounds the shaft and has its laminations extending axially of the core in the same manner as in the core of the electromagnet, whereby the magnet and armature will coact to provide the advantages as to construction and operation of the unit, as herein noted.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 4 is a sectional view taken on the line 4—4 of Fig. 1;

Fig. 5 is a sectional view taken on the line 5—5 of Fig. 1;

Fig. 6 is a sectional view taken on the line 6—6 of Fig. 4;

Fig. 7 is a sectional view taken on the line 7—7 of Fig. 4;

Fig. 8 is a sectional view taken on the line 8—8 of Fig. 5;

Fig. 9 is a fragmentary front elevation of the armature structure;

Fig. 10 is a sectional view taken on the line 10—10 of Fig 9;

Fig. 11 is a fragmentary rear elevational view of the armature structure;

Fig. 12 is a sectional view taken on the line 12—12 of Fig. 9;

Fig. 13 is a diagrammatic view of the three phase winding of the electromagnet;

Fig. 14 is a diagram showing how the winding for the magnet may be modified for single phase current, and Fig. 15 is a diagram of a modified form of winding applicable to the core of the magnet.

Figure 1:
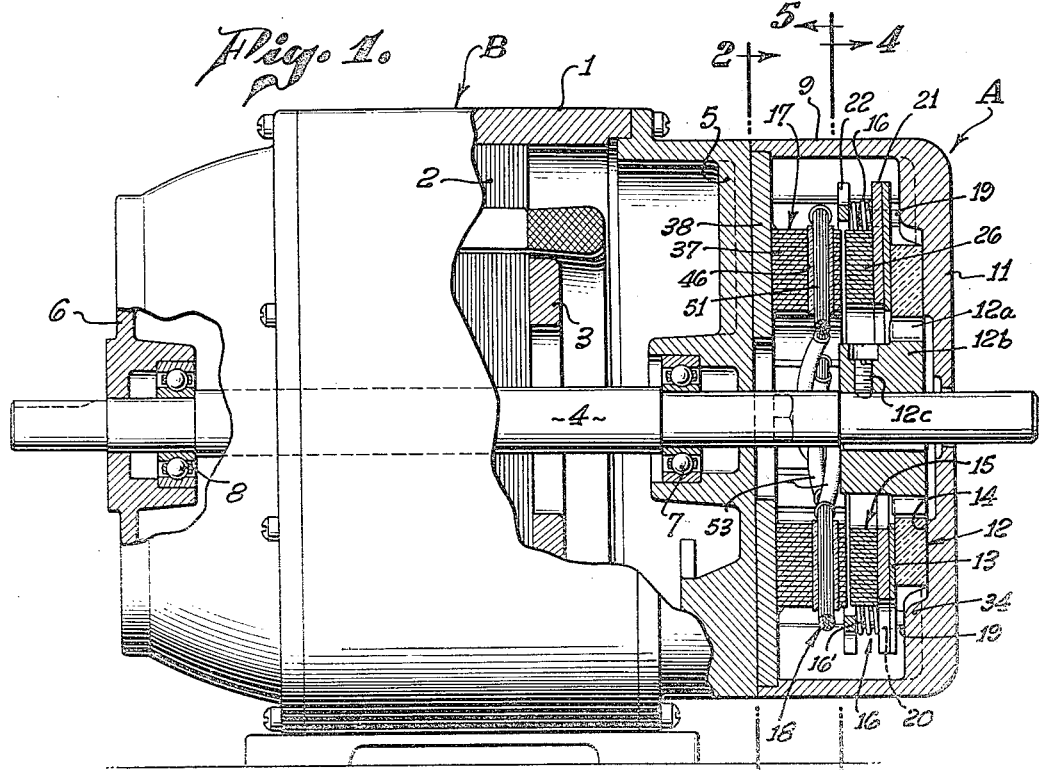
Fig. 1 is a fragmentary sectional view of a magnetic brake embodying the present invention, as applied to an electric motor.

As shown in Fig. 1, a magnetic brake A embodying the present invention is applied to an electric motor B including a housing 1, containing the usual field 2, armature 3 and armature shaft 4. The shaft 4 is extended through the ends 5 and 6 of the motor housing and supported by bearings 7 and 8 on said ends.

A cylindrical housing 9 containing the magnetic brake mechanism of this invention, is adapted to be attached to the motor housing 1 and is closed at its outer end by a wall 11. The armature shaft 4 may be extended as shown in Fig. 1 through the wall 11 whereby driving power may be applied from either or both ends of the shaft.

The brake mechanism generally comprises an annular rotative brake element 12 in the form of a composition disk driven by the shaft 4 and axially movable relative thereto between non-rotative, annular brake elements 13 and 14. The rotative element 12 is splined as at 12a on a hub 12b which is keyed to the shaft 4 and held against axial movement by means of a set screw 12c.

The element 13 is fixed to an annular armature structure 15 which is non-rotative and axially movable to cause opposite sides of the brake element 12 to contact the elements 13 and 14 to set the brake. This movement is effected by spring means 16, whereas movement of the armature structure 15 and brake element 13 thereon to release the brake, is effected by an annular electromagnet structure 17, the winding 18 of which is adapted to be connected in the circuit for the motor B. The electromagnet structure 17 is secured in place in the housing 9 by means of bolts 10, as shown in Fig. 7. All of these parts except the spring means, surround the shaft, are closely spaced, and require but a small movement of the axially movable parts to set and release the brake, thereby making it possible to provide a compact brake unit of small dimensions.

As here shown, the non-rotative brake element 14 is formed by an annular portion of the inner surface of the end wall 11 of the brake housing 9, whereby heat developed in the braking operation, readily will be dissipated by the brake housing.

The spring means 16 comprises a plurality of helical springs 16' mounted on pins 19 set in the wall 11 of the brake housing 9. These pins extend through registering openings 20 formed in the brake element 13 and an annular backing plate 21 of the armature structure, to which plate the element 13 is fixed, for example by being welded thereto. Thus, the pins 19 prevent rotation of and support the armature structure 15 for limited axial movement. The outer ends of the springs 16' bear against the back of the plate 21, the springs being held under compression on the pins 19 by means of a flat compression ring 22 bearing against the inner ends of the springs as shown in Figs. 1 and 7. This ring has a series of peripheral notches 22' which when aligned with a series of bosses 23 on the interior of the cylindrical wall of the brake housing 9, permit the ring to be positioned and manipulated for compressing and holding the springs 16' in place with the ring releasably locked to bosses 23. The bosses 23 have bores therethrough for reception of the bolts 10.

To provide for locking the ring 22, the bosses 23 have transverse slots 24 opposed to the outer peripheral edges of the ring, whereby upon turning the ring about its axis, the edge portions between the notches 22' may be engaged in the recesses 24. The ring 22 may be held in locked position by means of a set screw 23' which screws into the wall 11 of the brake housing 9 as shown in Fig. 6. The slots 24 are located in such axially spaced relation to the rotative and non-rotative brake elements, that when the ring 22 is locked therein, the springs 16' will be under considerable compression. This is desired, as it causes a quick, effective application of the brake under a high braking torque which remains effective regardless of wear of the brake elements, thereby eliminating adjustments and the replacement of parts, to compensate for wear.

The annular armature structure 15 includes an annular laminated core 26 in which the laminations extend axially thereof. As shown in Figs. 11 and 12, this core is spirally laminated and welded as at 27 to the opposite edges of tongues 28 as well as to edges of the plate 21 between these tongues. This welding of the core 26 to the backing plate takes place before the annular braking element 13 is secured to the backing plate. The element 13 is also welded to the plate 21.

The backing plate 21 and the annular brake element 13 thereon are of greater diameter than the armature core 26 which is centered thereon, whereby the outer marginal portion of the plate and the element project from the outer periphery of the core. These projecting portions are provided with a series of recesses 32 to accommodate the bosses 23.

The spaces 36 between the inwardly projecting tongues 28 of the backing plate 21 are open at the inner periphery of the annular armature structure. These open spaces and the recessed formation of the backing plate assure an effective heat dissipating and cooling action of the armature structure as a whole, as well as reduce the weight and bulk thereof.

Figures 2, 3:
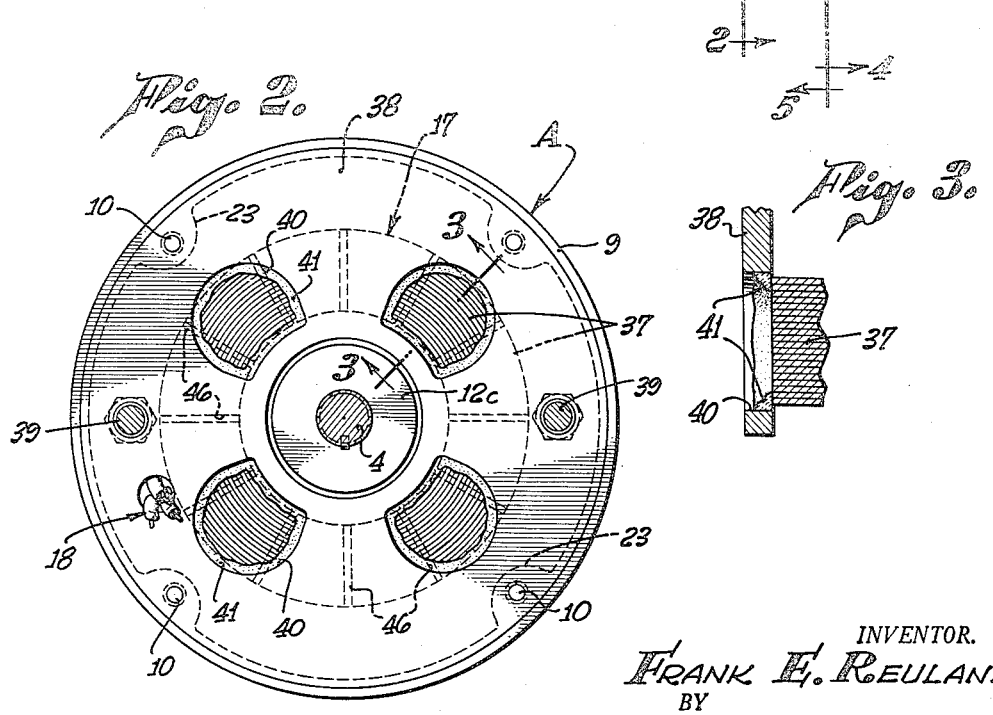
Fig. 2 is a cross sectional view taken on the line 2—2 of Fig. 1.
Fig. 3 is a fragmentary sectional view taken on the line 3—3 of Fig. 2.

The electro-magnet structure 17 includes an annular laminated core 37 centered on and welded to an annular backing plate 38. This plate is held in position closing the inner end of the brake housing 9 by means of the bolts 10 as shown in Fig. 7, and provides for mounting the brake unit on the motor housing 1. For this purpose the plate 38 is secured to the end 5 of the motor housing 1 by means of bolts 39, as shown in Fig. 2, with the core 37 and the plate surrounding the armature shaft 4.

The laminations of the core 37 extend axially so as to correspond to the laminations of the armature core 26. As here shown, the core 37 is spirally laminated in the same manner as the armature core. Consequently, to hold the lamination in place, the backing plate 38 is provided with a series of openings 40, as shown in Figs. 2 and 3, whereby the core may be welded to the plate along edges of the openings 40, as at 41, with the welds extending radially across the face of the core opposed to the plate. The opposite face of the core 37 is opposed to the core 26 of the armature with an appropriate air gap therebetween, as shown in Figs. 1 and 7.

In having the annular magnet core 37 formed of circumferential or arcuate laminations extending axially of the unit, provision is made for the novel and efficient winding or coil 18 adapted to be connected in the circuit for the motor B. This winding and the formation of the cores of the magnet and armature, provide a magnet unit having sufficient flux to make possible the use of exceptionally strong springs for setting the brake, inasmuch as the flux developed, readily will overcome the force of the springs without objectionable hum or chattering of the components of the unit, or requiring the use of shading means.

Accordingly, the annular face of the magnet core 37 opposed to the armature core 26 has a series of spaced grooves 46 extending radially thereacross and of sufficient axial extent or depth to countersink therein portions of the winding 18 and form segmental poles 47. The inner portions or bottoms of the grooves 46 are enlarged, thereby forming shoulders 46' for retaining the windings in the groove.

The winding 18 as here shown is of the skein type and makes it possible to provide a magnet structure of small dimensions producing a strong flux with either single or polyphase current. However, the core lends itself to other forms of windings and in all cases the magnetic structure consisting of but one laminated core of annular form or such other shape as to form a continuous core surrounding the shaft, and provided with a simple form of winding taking up but little space beyond the overall dimensions of the core, will produce a flux more effective for actuating the armature without hum or chatter or requiring adjustment for wear, or for misalignment between the core and the armature, than in brakes where a plurality of separate magnets and cores are employed for use with alternating current.

As shown in Figs. 5 and 13, the skein type winding 18 consists of three like loops or skeins 50, each being of generally hour-glass shape. These skeins overlie one another in axially spaced relation and are angularly spaced about the axis of the core 37. Each skein forms a loop having opposite side portions 51 countersunk in the grooves 46, arcuate end portions 52 lying upon the outer periphery of the core, and arcuate side portions 53 between the portions 51, lying adjacent the inner periphery of the core. As here shown, the skeins 50 are "star" connected, although obviously, they may be "delta" connected, as shown in Fig. 15.

Fig. 13 shows schematically the manner in which the coils are electrically connected as well as the physical arrangement of the skeins on the core 37, and how the overlapping portions of the skeins with respect to the segments of the core formed by the grooves 46 will provide the arcuate poles 47. With this arrangement, a pair of opposed segments of the core 37 are embraced by one of the skeins 50, and portions of these segments angularly spaced about the axis of the core are embraced by the other two skeins. This makes it possible to use one continuous, laminated core with a compact and simple form of winding taking up but little more space than the core itself and providing for the development of a strong flux. The strong flux makes it possible to use comparatively strong springs and a larger-than-usual air gap between the poles 47 and the armature. Such a large air gap and the strong springs make the brake self-compensating for wear of the brake elements and parts of the magnet and armature.

Fig. 14 shows the star connected winding as modified by the inclusion of a condenser 57 to adapt the magnet for operation responsive to single phase alternating current. Figs. 13, 14 and 15 do not show the manner of connecting the electromagnet with the motor circuit, as such connections are well known in this art, and such that the magnet will be energized and deenergized incident to the motor circuit being closed and opened.

I claim:

1. In an electro-magnetic brake for a rotary shaft: a housing for said brake, an armature in said housing; means mounting said armature for movement axially of said shaft; spring means urging said armature toward an interior wall of said housing; brake means movable against said interior wall for frictionally resisting rotation of said shaft responsive to movement of said armature toward said interior wall; and electro-magnetic means operable in said housing for moving said armature to release said brake means, and said magnetic means including an annular spirally laminated core having grooves circumferentially spaced therein and a winding having portions in said grooves and other portions on the inner and outer peripheries of the core, the laminations of said core surrounding said shaft.

2. In an electro-magnetic brake for a rotary drive shaft, a housing for said brake, a movable brake member in said housing adapted to be drivingly connected with said shaft, an annular, laminated armature structure movable toward an interior wall of said housing for moving said brake member into braking contact with said wall; supporting means for said armature structure in said housing, spring means mounted on said supporting means urging said armature structure toward said interior wall, and an electro-magnet in said housing having an annular laminated core, operable for moving said armature structure in a brake releasing direction, the laminations of said armature structure and said core extending axially of said shaft.

3. In an electromagnetic brake for a rotary shaft, a housing for said brake; an annular laminated armature structure in said housing in which the laminations extend axially thereof; means for supporting said armature structure in non-rotative, axially movable and surrounding relation to said shaft; a non-rotative braking element opposed to said armature structure; a rotative braking element between said armature structure and said non-rotative element; means for drivingly and axially movably connecting said rotative braking element with said shaft; spring means on said supporting means urging said armature structure against said rotative element, and said rotative element against said non-rotative element to set the brake against an interior wall of said housing; and an electromagnet structure for moving said armature structure in brake releasing direction, including an annular spirally laminated core in which the laminations extend axially thereof.

4. In an electro-magnetic brake for a rotary shaft, a housing for said brake, an annular armature structure having a laminated core in which the laminations are adapted to surround the shaft, an annular backing plate for said armature structure, said plate having portions projecting across a face of said annular armature structure, said plate and said portions being welded one to the other along edges of said portions, an annular braking element fixed to said backing plate, braking means cooperable with said element for setting the braking element against an interior wall of said housing, means engaging said plate for urging said armature structure in brake setting direction, and an electro-magnet for urging said armature structure to move in brake releasing direction.

5. In an electro-magnetic brake for a shaft, a housing for said brake, means forming a brake to restrain movement of said shaft, including an armature structure movable axially of the shaft to set and release the brake; supporting means for said armature structure in said housing, means urging said armature structure toward an interior wall of said housing to set the brake, said urging means mounted on said supporting means, means for moving the armature structure in a direction for releasing the brake, including an electro-magnet having a spirally laminated core adapted to surround said shaft; edges of said laminations on one side of said core forming an annular surface opposed to said armature structure, said core having grooves extending across said surface, and a winding having portions embracing segments of said core defined between said grooves; portions of said winding being mounted in said grooves.

6. In an electro-magnetic brake for a shaft, a housing for said brake, means forming a brake to restrain movement of said shaft, including an armature structure movable axially of the shaft, to set and release the brake; supporting means for said armature structure in said housing, means urging said armature structure toward an interior wall of said housing to set the brake, said urging means mounted on said supporting means, means for moving the armature structure in a direction for releasing the brake, including an electro-magnet having a spirally laminated core adapted to surround said shaft; edges of said laminations on one side of said core forming an annular surface opposed to said armature structure, said core having grooves extending across said surface, and a winding having portions embracing segments of said core defined between said grooves, portions of said winding being mounted in said grooves, said armature including a spirally laminated core adapted to surround said shaft.

7. In an electro-magnetic brake for a shaft, a housing for said brake, means forming a brake to restrain movement of said shaft, including an armature structure movable axially of the shaft to set and release the brake; supporting means for said armature structure in said housing, means urging said armature structure toward an interior wall of said housing to set the brake, said urging means mounted on said supporting means, means for moving the armature structure in a direction for releasing the brake, including an electro-magnet structure having a laminated core adapted to surround said shaft, a member to which said core is fixed, with the edges of the laminations on one side of the core forming a surface opposed to said armature structure, said core having grooves extending across said surface, and a winding forming a plurality of axially spaced, electrically connected loops having portions mounted in said grooves, one of said loops embracing opposed segments of said core, each of the other loops embracing a portion of said segments.

8. In an electromagnetic brake for a rotary shaft, a housing having an end wall forming on the interior thereof a non-rotative braking element adapted to surround said shaft, a rotative braking element opposed to said non-rotative element, means drivingly and axially movably connecting said rotative element with said shaft, an armature structure adapted to surround said shaft, means supporting said armature structure in said housing in non-rotative and axially movable relation to said shaft including members fixed to said wall and slidably supporting said armature structure, springs on said last named means for urging said armature structure against said rotative braking element and said rotative braking element against said non-rotative braking element, a ring for contacting and holding said springs under tension against said armature structure, means for locking said ring to said housing, and an electromagnet adapted to surround said shaft, operable for moving said armature structure in brake-releasing direction.

9. An electro-magnetic brake including: a rotary shaft; a housing in which said shaft is operable; a rotative braking element opposed to a part of the housing; means drivingly and axially movably connecting said rotative element with said shaft; an annular armature structure surrounding said shaft; means supporting said armature structure in said housing for axial movement relative to said shaft; said last named means including pins on said housing; a ring fixed in said housing; notches in the periphery of said armature structure and bosses for said notches in said housing to restrain rotative movement of said ring; springs on said pins with the ends thereof abutting said ring and said armature structure for urging said armature structure against said rotative element to move the latter against said part of the housing; and electromagnetic means in said housing operable for moving said armature structure in brake-releasing direction.

10. An electro-magnetic brake including: a rotary shaft; a housing in which said shaft is operable; a rotative braking element adapted to press in braking engagement against an interior wall of the housing; means drivingly and axially movably connecting said rotative element with said shaft; an annular armature structure surrounding said shaft; said armature structure including an annular spirally laminated core and an annular backing plate to which said core is fixed; a braking plate fixed to said backing plate and engaging said rotative braking element; means supporting said armature structure in said housing for axial movement relative to said shaft; a ring fixed in said housing; spring means interposed between said backing plate and said ring for urging said armature structure and said rotative braking element to move the latter into braking contact with said wall; and electromagnet means in said housing operable for moving said armature structure in brake-releasing direction.

11. An electro-magnetic brake including: a rotary shaft; a housing in which said shaft is operable; a rotative braking element opposed to a part of the housing; means drivingly and axially movably connecting said rotative element with said shaft; an annular armature structure surrounding said shaft; said armature structure including an annular spirally laminated core and an annular backing plate to which said core is fixed; a braking plate fixed to said backing plate and engaging said rotative braking element; means supporting said armature structure in said housing for non-rotative axial movement relative to said shaft; a ring fixed in said housing; said ring having peripheral notches; bosses on said housing extending into said notches to restrain rotative movement of said ring; spring means interposed between said armature structure and said ring for urging said armature structure and said rotative braking element to move the latter into braking contact with said part of the housing; and electromagnet means in said housing operable for moving said armature structure in brake-releasing direction.

References Cited in the file of this patent

UNITED STATES PATENTS

| | | |
|---|---|---|
| 2,368,317 | Meyer et al. | Jan. 30, 1945 |
| 2,512,565 | Hallander | June 20, 1950 |
| 2,543,830 | Burns et al. | Mar. 6, 1951 |

FOREIGN PATENTS

| | | |
|---|---|---|
| 573,421 | Great Britain | Nov. 20, 1945 |